C. E. SWARTZBAUGH.
NOODLE CUTTER.
APPLICATION FILED JAN. 23, 1911.

1,024,535.

Patented Apr. 30, 1912.

WITNESSES:
G. R. Aylsworth.
Leona Kiburtz

INVENTOR:
Charles E. Swartzbaugh,
By Almon Hall, His Atty.

COLUMBIA PLANOGRAPH CO., WASHINGTON, D. C.

UNITED STATES PATENT OFFICE.

CHARLES E. SWARTZBAUGH, OF TOLEDO, OHIO.

NOODLE-CUTTER.

1,024,535.　　　　Specification of Letters Patent.　　Patented Apr. 30, 1912.

Application filed January 23, 1911. Serial No. 604,023.

*To all whom it may concern:*

Be it known that I, CHARLES E. SWARTZBAUGH, a citizen of the United States, residing at Toledo, in the county of Lucas and State of Ohio, have invented certain new and useful Improvements in Noodle-Cutters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.
Noodles are usually made by first rolling the dough or pastry into a thin sheet and by then slicing the sheet into narrow strips, one at a time. This process is slow and tedious.
My invention relates to means for overcoming, largely, the difficulty here indicated, and is designed, more particularly, to furnish a cheap, simple, durable kitchen implement by which noodles may be cut rapidly and uniformly.

My invention also relates to certain details of construction hereinafter described and pointed out in the claims.

I attain the objects above indicated by means of the devices, construction and arrangement of parts hereinafter described, and shown and illustrated in the accompanying drawings, in which,—

Figure 1:
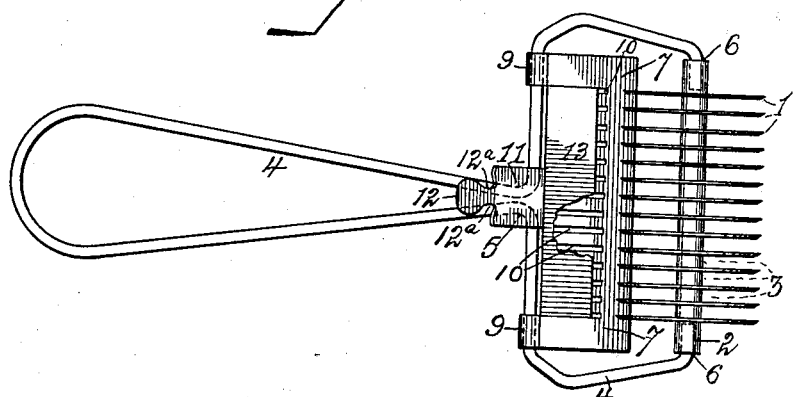
Figure 2:
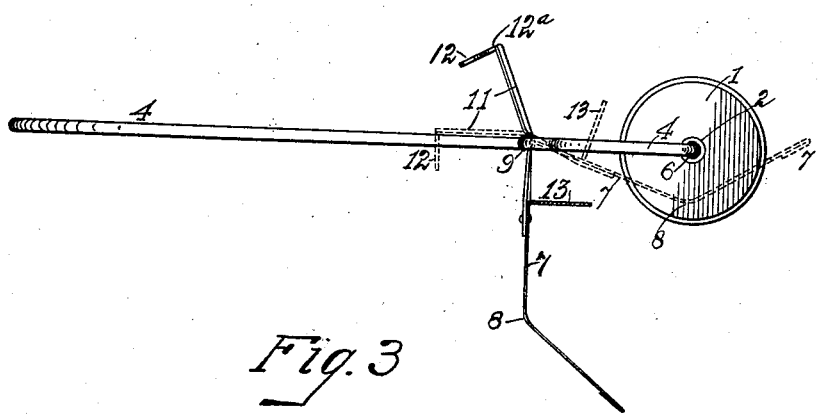
Figure 3:
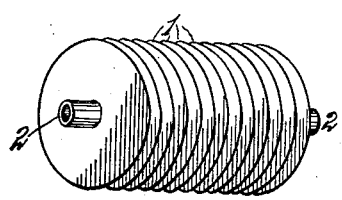

Figure 1 is a top-plan view of my device with a portion broken away to show more clearly the pivoted slotted plate, hereinafter referred to; Fig. 2, a side-elevation of the same, in which the dotted lines indicate the parts in operative position, and Fig. 3, a perspective view of the cutting disks and their shaft, detached.

Like numerals indicate like parts throughout the drawings.

In the drawings, 1—1 are thin sharp cutting disks mounted upon a hollow shaft 2 and separated and held at equi-distant intervals by short interposed sleeves 3. 4 is a handle consisting of a stout wire bent at its middle to form a loop, the sides of which converge and nearly meet, as at 5. From this point the branches of the wire loop are oppositely bowed in such fashion that the extremities of the wire project into the opposite ends of the hollow shaft 2, as at 6. The resiliency of the wire 4 holds the opposite ends of the wire normally pressed inwardly into engagement with the shaft 2, thus furnishing a bearing upon which the shaft and the disks may revolve.

7 is a plate, bent as at 8, a margin of which is pivoted, as at 9, upon the diverging arms of the wire handle. In the plate is a series of slots 10 corresponding in number and position to the disks 1. The plate 7 may be swung upon its pivot into the position indicated by the dotted lines in Fig. 2, so that the several cutting disks will, at their lower edge protrude through the slots 10. The angle 8 of the plate 7 slides over the top of the flat sheet of pastry keeping the strips—as they are cut—smooth and flat while the edges of the several slots clear the cutting disks of adhering particles of dough and flour. The plate 7 is held in operative position by means of a backwardly extending arm 11, which may be formed integral with the plate, and having a downwardly turned portion 12, having rounded or angular edges, as shown. The part 12 may be forced between the converging arms of the handle which yield to the wedge-like action of the part 12, and when the plate 7 reaches the proper operative position, illustrated by the dotted lines in Fig. 2, the opposed wires of the handle snap into the notches 12ª in the sides of the part 12. Thus the notched extension 11—12 forms a stop which limits the swing of the plate 7 upon its pivot and furnishes means for holding the plate in operative position until the arms are forced apart sufficiently to release the notched piece 12.

Secured to the top of the plate 7 and at a right angle thereto, is a narrow plate 13 which forms a thumb-guard to prevent the thumb of the operator from coming in contact with the sharp edges of the disk when in operation.

The parts being assembled, as above described, and the plate 7 being placed in the position indicated by the dotted lines, the operator grasps the handle, with his thumb resting against the thumb-guard. The disks are now pressed down upon the sheet of pastry with sufficient stress to cut through the sheet and the instrument is pushed or drawn rapidly along in a right line, cutting the pastry into as many strips as there are cutting-disks. The operation is now repeated in a line parallel with the first series of cuts, and so on until the work is completed. By forcing the extremities of the wire handle sufficiently apart, the shaft, with its several disks thereon, is released and the parts may now be readily and conveniently cleaned.

Having described my invention, what I claim and desire to secure by Letters Patent is,—

1. In a device of the described character, a shaft, a series of cutting disks on the shaft, a handle having portions in which the ends of the shaft are supported, a slotted plate pivotally carried by the handle, and means upon the plate for detachably engaging the handle to prevent the plate from swinging upon its pivot.

2. A device of the described character comprising in its construction a shaft, equidistant cutting disks mounted on the shaft, a wire bent at its middle to form a loop with converging sides and being further bent to engage the opposite ends of said shaft, a plate pivoted upon said wire and having slots for the reception of the disks, an extension upon said plate adapted to engage the converging portions of the handle and to hold the plate in operative position, and a thumb-guard mounted upon said plate in proximity to the series of disks.

In testimony whereof I affix my signature in presence of two witnesses.

CHARLES E. SWARTZBAUGH.

Witnesses:
LEONA KIBURTZ,
WM. C. BINNS.

Copies of this patent may be obtained for five cents each, by addressing the "Commissioner of Patents, Washington, D. C."